US009150063B2

(12) United States Patent
Tanaka

(10) Patent No.: US 9,150,063 B2
(45) Date of Patent: Oct. 6, 2015

(54) CONNECTION DEVICES AND PULLING DRIVE VEHICLES OR PULLING CARRIAGES WITH THE CONNECTION DEVICE

(71) Applicant: TOMAC CO., LTD., Toyota-shi, Aichi (JP)

(72) Inventor: Tsutomu Tanaka, Toyota (JP)

(73) Assignee: Tomac Co., Ltd., Aichi (JP)

( * ) Notice: Subject to any disclaimer, the term of this patent is extended or adjusted under 35 U.S.C. 154(b) by 0 days.

(21) Appl. No.: 14/405,074

(22) PCT Filed: Mar. 5, 2014

(86) PCT No.: PCT/JP2014/055641
§ 371 (c)(1),
(2) Date: Dec. 2, 2014

(87) PCT Pub. No.: WO2014/171216
PCT Pub. Date: Oct. 23, 2014

(65) Prior Publication Data
US 2015/0165849 A1 Jun. 18, 2015

(30) Foreign Application Priority Data
Apr. 19, 2013 (JP) ................................. 2013-088474

(51) Int. Cl.
*B62D 1/02* (2006.01)
*B60D 1/02* (2006.01)
*B60D 1/26* (2006.01)
*B61G 1/32* (2006.01)
*B64F 1/22* (2006.01)
*B60D 1/07* (2006.01)

(52) U.S. Cl.
CPC .. *B60D 1/02* (2013.01); *B60D 1/07* (2013.01); *B60D 1/26* (2013.01); *B61G 1/32* (2013.01); *B64F 1/22* (2013.01); *B64F 1/225* (2013.01)

(58) Field of Classification Search
CPC ............ B64F 1/22; B64F 1/224; B64F 1/225; B60D 1/07
See application file for complete search history.

(56) References Cited

U.S. PATENT DOCUMENTS 2,773,703 A * 12/1956 Ferguson et al. .......... 280/476.1
3,004,773 A * 10/1961 Ankeney .................... 280/446.1
3,161,422 A   12/1964 Wade
(Continued)

FOREIGN PATENT DOCUMENTS

JP    05-021442    1/1993
JP    10-315725    12/1998
(Continued)

*Primary Examiner* — Tony Winner
(74) *Attorney, Agent, or Firm* — Patterson Thuente Pedersen, P.A.

(57) ABSTRACT

A connection device for pulling an aircraft. The connection device includes first and second connection portions, a connection rod and a rod retaining portion. The first and second connection portions have first and second guide spaces into which the connection arm is inserted. First and second arm receiving portions are pushed to rotate from a standby state by the connection arm inserted into the first or second guide space, and are connected by a link member. When the first arm receiving portion rotates from the standby state, the rod retaining portion rotates together with the first arm receiving portions, and enables the connection rod to pass through the second hole so that the connection rod is connected to the connection arm inserted into the first guide space or the second guide space.

9 Claims, 9 Drawing Sheets

(56) References Cited

U.S. PATENT DOCUMENTS

| | | | |
|---|---|---|---|
| 4,113,041 A * | 9/1978 | Birkeholm | 180/14.1 |
| 4,470,564 A * | 9/1984 | Johnson | 244/50 |
| 4,516,744 A * | 5/1985 | Burnside | 244/17.17 |
| 4,955,777 A * | 9/1990 | Ineson | 414/426 |
| 5,048,625 A * | 9/1991 | Birkeholm | 180/14.6 |
| 6,543,790 B2 * | 4/2003 | Johnson | 280/3 |
| 8,562,014 B2 * | 10/2013 | Seidman et al. | 280/503 |
| 8,939,461 B1 * | 1/2015 | Kalmanson | 280/503 |
| 2006/0097106 A1 * | 5/2006 | MacGregor et al. | 244/50 |
| 2013/0334791 A1 * | 12/2013 | Van Der Lelij | 280/416.1 |

FOREIGN PATENT DOCUMENTS

| | | |
|---|---|---|
| JP | 2008-189064 | 8/2008 |
| JP | 2013-147208 | 8/2013 |

\* cited by examiner

CONNECTION DEVICES AND PULLING DRIVE VEHICLES OR PULLING CARRIAGES WITH THE CONNECTION DEVICE

RELATED APPLICATIONS

The present application is a National Phase entry of, and claims priority to, PCT Application No. PCT/JP2014/055641, filed Mar. 5, 2014, which claims priority to Japanese Patent Application No. 2013-088474, filed Apr. 19, 2013, both of which are incorporated herein in their entireties by reference.

BACKGROUND OF THE INVENTION

Embodiments of the present invention relate to a connection device for connecting pulling bodies to each other, and a pulling drive vehicle or a pulling carriage, on which the connection device is provided.

In various pulling operations, such as the pulling of an aircraft at an airport, the pulling of a carriage in a manufacturing line or the like, one pulling body and another pulling body are connected to each other. As a result, the another pulling body is pulled by the one pulling body.

The pulling bodies connected to each other in the above pulling operations are connected together by, for example, the following construction. The construction has one pulling body equipped with a connection device and the other pulling body equipped with a connection arm extending toward the connection device. The connection device has a connection portion into which the connection arm of the other pulling body is inserted, and a connection rod connecting the connection portion with the connection arm. The connection portion of the connection device and the connection arm are respectively equipped with a hole. The connection portion of the connection device and the connection arm are connected to each other by the connection arm. A connection device of this type is disclosed, for example, in Japanese Laid-Open Patent Publication No. 2008-189064.

In the conventional connection device described above, the height allowing the insertion of the connection arm into the connection portion is restricted. Thus, when the height of the connection arm is changed in accordance with various conditions, it may be difficult to connect the two pulling bodies. Thus, there is a need for a connection device capable of securely connecting two pulling bodies even when the height of a connection arm extending from one pulling body toward the other pulling body is changed.

SUMMARY OF THE INVENTION

According to one aspect of the invention, a connection device for connecting to a connection arm includes a first connection portion, a second connection portion, a first rod guide portion, a second rod guide portion, a first arm receiving portion, a second arm receiving portion, a link member, and a rod retaining portion. Formed in the first connection portion is a first guide space into which the connection arm is inserted. The second connection portion is provided below the first connection portion, and, formed in the second connection portion is a second guide space into which the connection arm is inserted. The first rod guide portion is provided above the first guide space, and a first hole is formed in the first rod guide portion. The second rod guide portion is provided above the second guide space, and a second hole is formed in the second rod guide portion. When the connection arm is inserted into the first guide space, the first arm receiving portion is pushed by the connection arm to rotate from a standby state. When the connection arm is inserted into the second guide space, the second arm receiving portion is pushed by the connection arm to rotate from a standby state. The link member connects the first arm receiving portion and the second arm receiving portion such that the first arm receiving portion and the second arm receiving portion rotate in conjunction with each other. The connection rod is passed through the first hole and the second hole. When the first arm receiving portion is in the standby state, the rod retaining portion supports the lower end of the connection rod within the first guide space. When the first arm receiving portion rotates from the standby state, the rod retaining portion rotates together with the first arm receiving portion, and allows the connection rod to pass through the second hole so that the connection rod is allowed to be connected to the connection arm inserted into the first guide space or the second guide space.

Thus, the connection device has a plurality of connection portions above and below. When the connection arm is inserted into one of the first guide space or the second guide space, the connection rod passes through the first hole and the second hole, and the connection rod and the connection arm are connected together. Even when the vertical position of the connection arm is changed, the connection arm may be inserted into the first guide space or the second guide space. As a result, the connection device is connected to the connection arm.

According to another aspect, the first arm receiving portion and the second arm receiving portion may be each inclined in its standby state with respect to a direction in which the connection arm is inserted. According to another aspect, the connection rod may move toward the second hole due to its own weight when its movement is allowed by the rod retaining portion. According to another aspect, the first hole and the second hole may be situated in the same normal.

According to another aspect, the link member may be provided at a position where the link member avoids interference with the connection arm when the connection arm connected to the connection rod rotates around the connection rod. Thus, it is possible to prevent the link member and the connection arm from contacting each other which would damage the link member and the connection arm.

According to another aspect, the first rod guide portion may be provided with a cylindrical portion continuous with the first hole and configured to guide a vertical movement of the connection rod. This makes possible to prevent the connection rod from tottering.

According to another aspect, a flange portion having a larger diameter than an inner diameter of the cylindrical portion may be provided on an upper portion of the connection rod. Above the cylindrical portion, there may be provided a buffer member configured to mitigate impact between the connection rod which has fallen due to its own weight and the flange portion. Thus, it is possible to prevent contact between the connection rod and the cylindrical portion. As a result, the shock applied to the connection rod and the cylindrical portion is reduced. This makes it possible to enhance the durability of the two members.

DETAILED DESCRIPTION OF THE INVENTION

Figure 1:
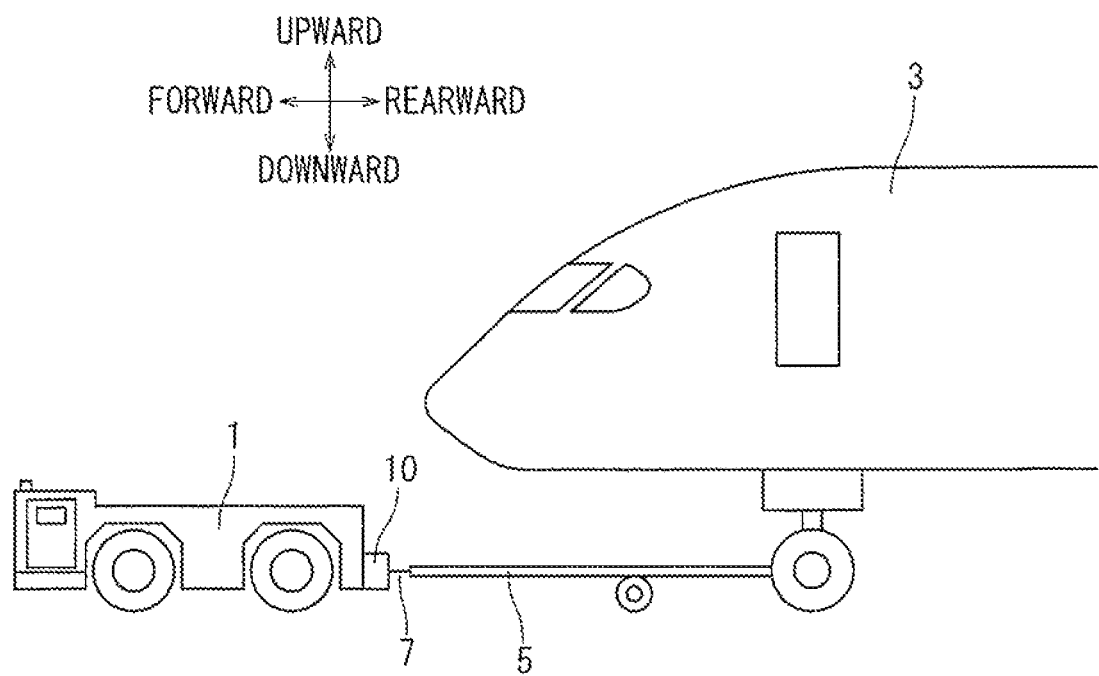
FIG. 1 is a side view showing a state where a pulling drive vehicle pulls an aircraft.
Figure 2:
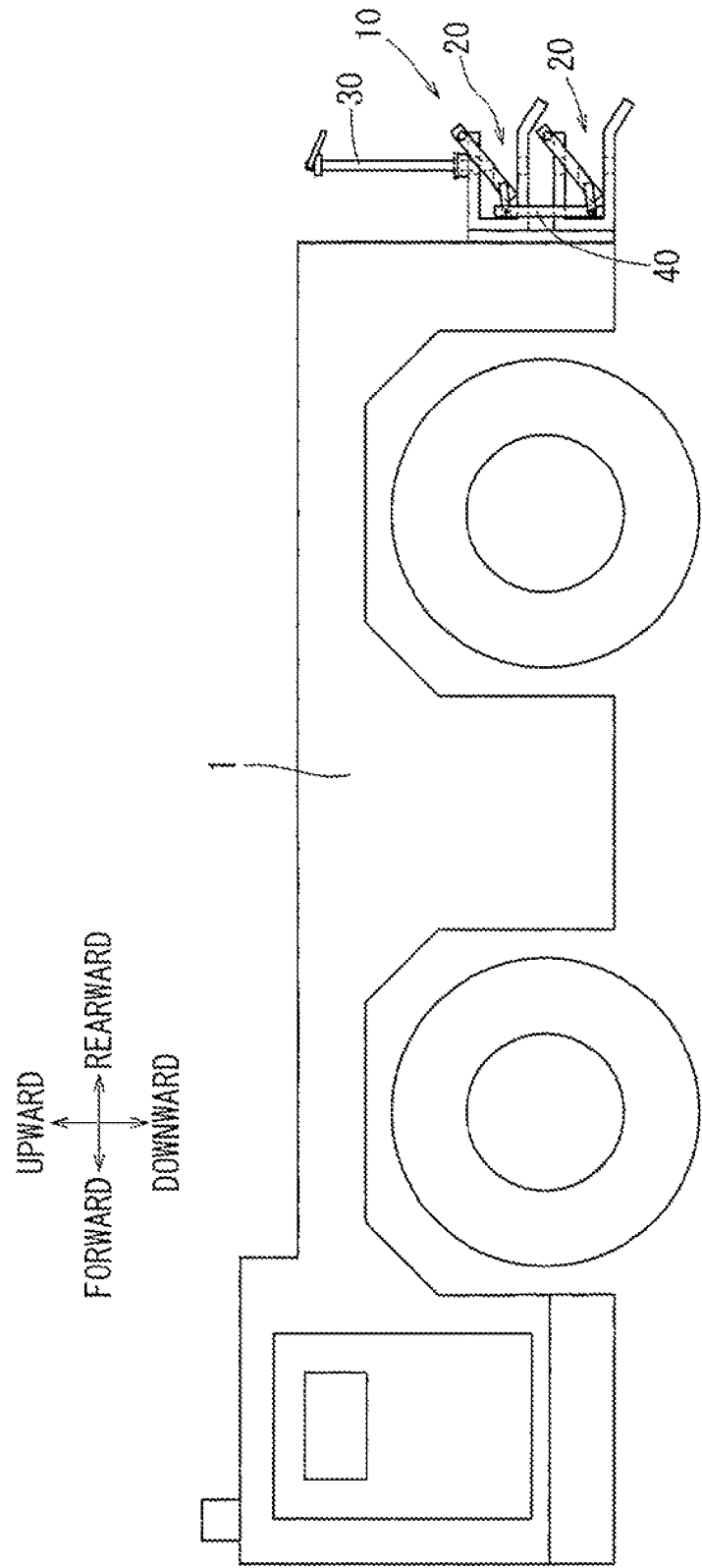
FIG. 2 is a side view of the pulling drive vehicle.

As shown in FIGS. 1 and 2, a connection device 10 is installed at the rear end of a pulling drive vehicle configured to pull an aircraft 3 on the ground at an airport. The pulling drive vehicle 1 pulls the aircraft 3, with the connection device 10 being connected to a connection arm 7 of a pulling connection vehicle 5 mounted to an axle of the aircraft 3. In this connection state, the connection arm 7 extending toward the connection device 10 is inserted into the connection device 10. Thus, the connection device 10 and the connection arm 7 are connected to each other.

Figure 3:
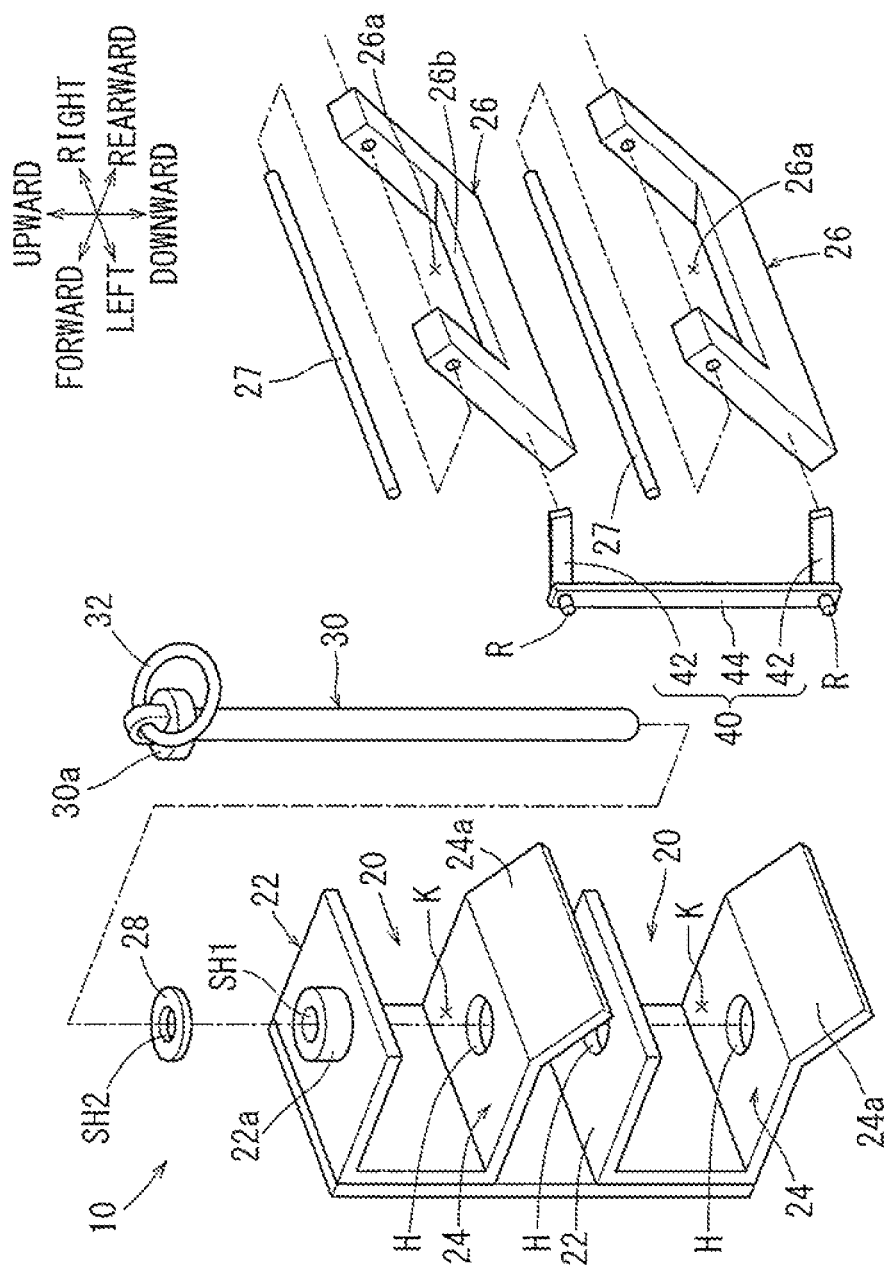
FIG. 3 is an exploded perspective view of a connection device.
Figure 4:
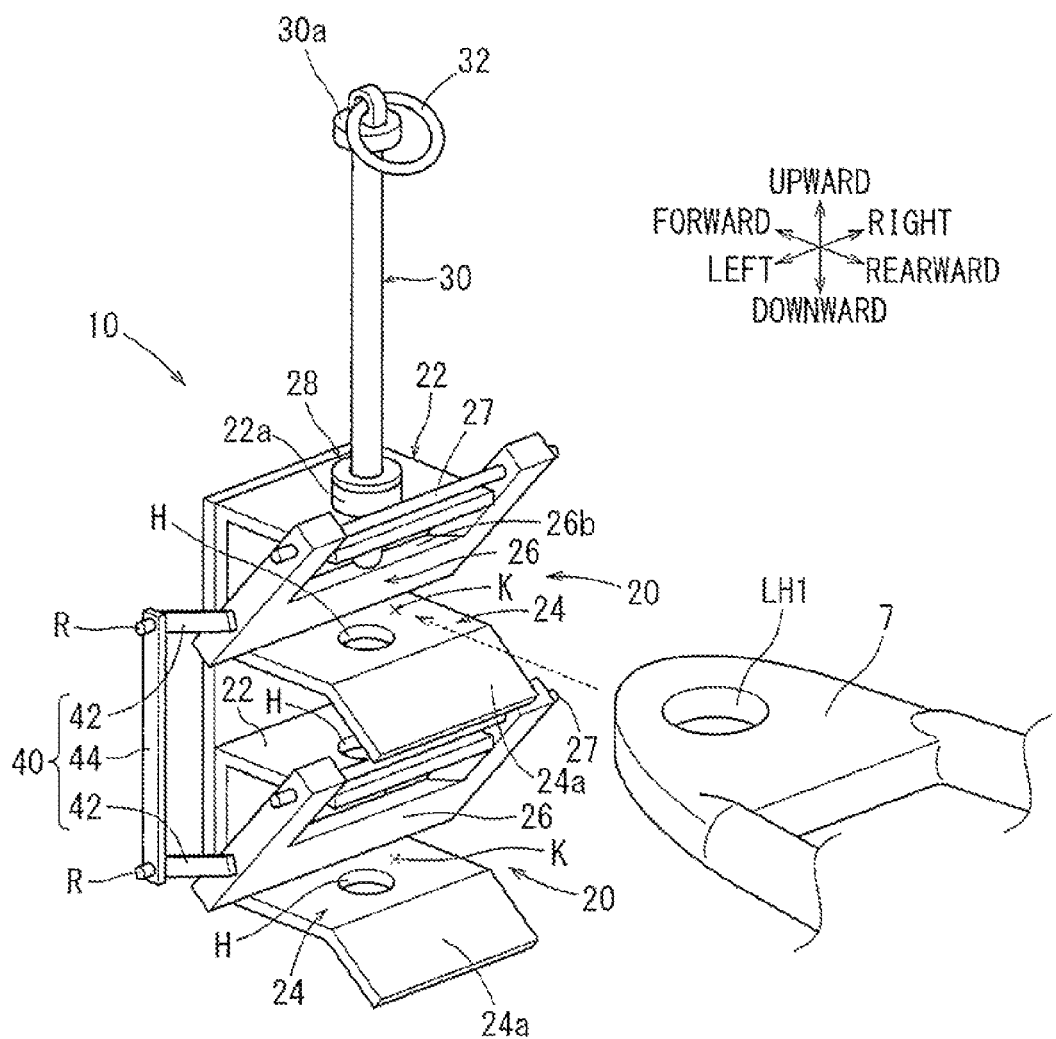
FIG. 4 is a perspective view of the connection device.
Figure 5:
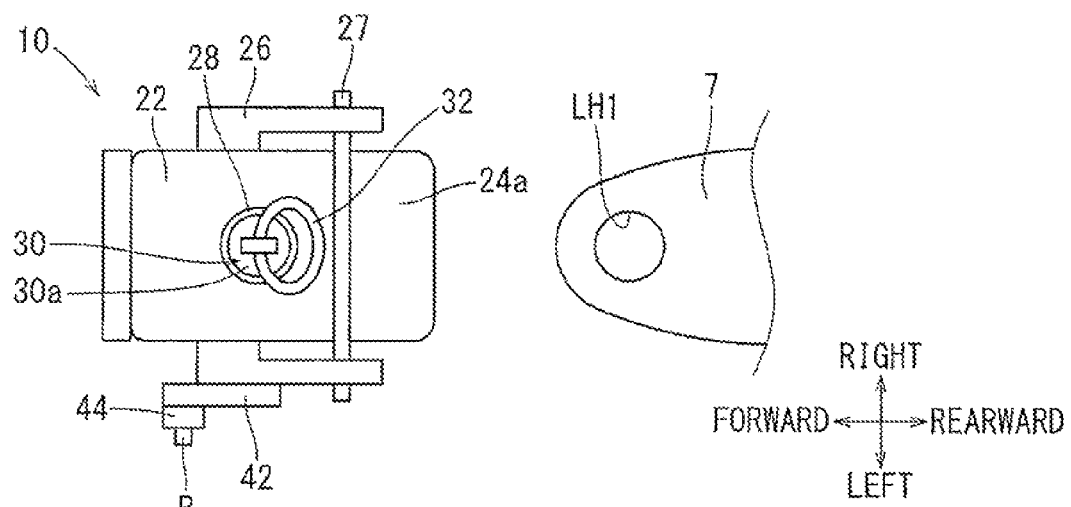
FIG. 5 is a plane view of the connection device.
Figure 6:
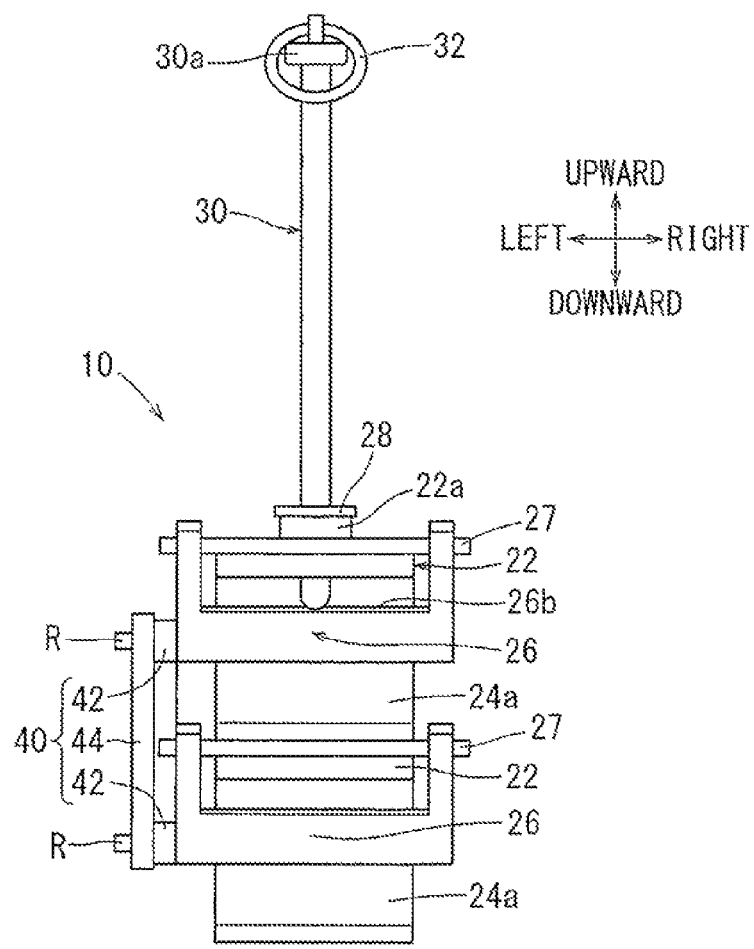
FIG. 6 is a rear view of the connection device.
Figure 7:
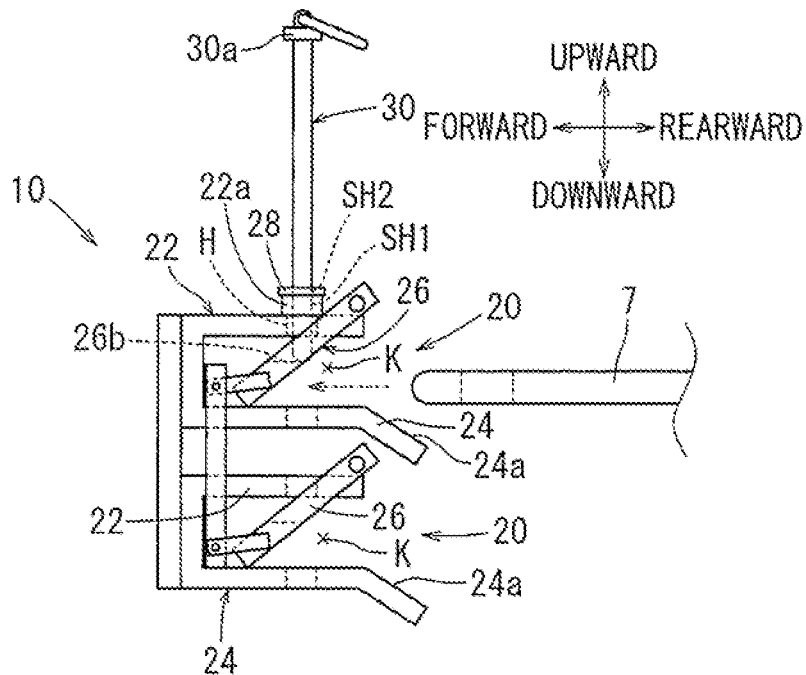
FIG. 7 is a side view of the connection device and a connection arm in a state before the connection arm is inserted into the connection device.

As shown in FIGS. 3 to 10, the connection device 10 has two, upper and lower, connection portions 20 capable of connecting with the connection arm 7. The connection device 10 has a connection rod 30 for connecting the connection arm 7 to either the upper or lower connection portion 20. The arrow in FIGS. 4 and 7 illustrates how the connection arm 7 is relatively inserted into the connection device 10.

Each connection portion 20 includes a guide space K, a guide lower portion 24, and an arm receiving portion 26 (See FIGS. 3 and 4). The guide space K enables the connection arm 7 to be inserted into the connection portion 20. A rod guide portion 22 is provided above the guide space K. The guide lower portion 24 is provided below the guide space K. The arm receiving portion 26 is provided between the rod guide portion 22 and the guide lower portion 24. When the connection arm 7 is inserted into the guide space K, the arm receiving portion 26 interferes with the connection arm 7.

The rod guide portion 22 is situated above the connection arm 7 inserted into the connection device 10 (See FIG. 4). The guide lower portion 24 is situated below the inserted connection arm 7. The rear end of the guide lower portion 24 has a guide surface 24a downwardly inclined. The guide surface 24a helps the connection arm 7 to be smoothly inserted into the guide space K.

The rod guide portion 22 and the guide lower portion 24 of each connection portion 20 are provided with a hole H for guiding the vertical movement of the connection rod 30 (See FIGS. 3, 4, and 7). The holes H of the connection portions 20 are arranged vertically in a straight line. The inner diameter of each hole H is larger than the outer diameter of the connection rod 30. As a result, the connection rod 30 can be vertically inserted into the holes H of each connection portion 20.

The rod guide portion 22 of the upper connection portion 20 is provided with a cylindrical portion 22a for guiding the vertical movement of the connection rod 30 (See FIGS. 3, 4, and 6). Cylindrical-portion hole SH1 extending vertically through the cylindrical portion 22a are continuous with the holes H. The inner diameter of the cylindrical-portion hole SH1 is set to substantially the same dimension as the outer diameter of the connection rod 30. The cylindrical portion 22a can prevent the connection rod 30 from tottering when the connection rod 30 moves in the vertical direction. In order to facilitate the vertical movement of the connection rod 30, the inner diameter of each hole H is larger than the inner diameter of the cylindrical-portion hole SH1.

The outer diameter of the cylindrical portion 22a is set to be substantially the same dimension as the outer diameter of a flange portion 30a of the connection rod 30 (See FIGS. 6 and 7). As a result, when the connection rod 30 falls from a rod retaining position shown in FIG. 7 due to its own weight, the flange portion 30a is received by the end of the cylindrical portion 22a. A ring-like buffer member 28 is provided at the end of the cylindrical portion 22a (See FIGS. 3 and 7). Thus, the flange portion 30a of the connection rod 30 is received by the buffer member 28. As a result, the impact applied to the cylindrical portion 22a and to the flange portion 30a is mitigated.

The buffer member 28 is made of, for example, a rubber having a predetermined thickness. At the central portion of the buffer member 28, there is formed a buffer-member hole SH2 extending vertically therethrough (See FIG. 3). The buffer-member hole SH2 is provided so as to be continuous with the cylindrical-portion hole SH1. The inner diameter of the buffer-member hole SH2 is set to substantially the same dimension as the outer diameter of the connection rod 30, thus allowing the insertion of the connection rod 30.

Figure 9:
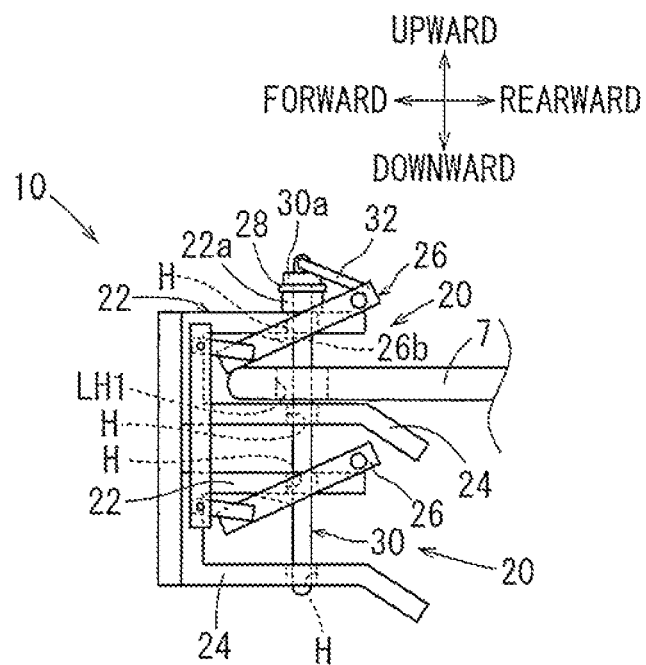
FIG. 9 is a side view of the connection device and the connection arm in a state when the connection arm and the connection device are connected to each other.
Figure 10:
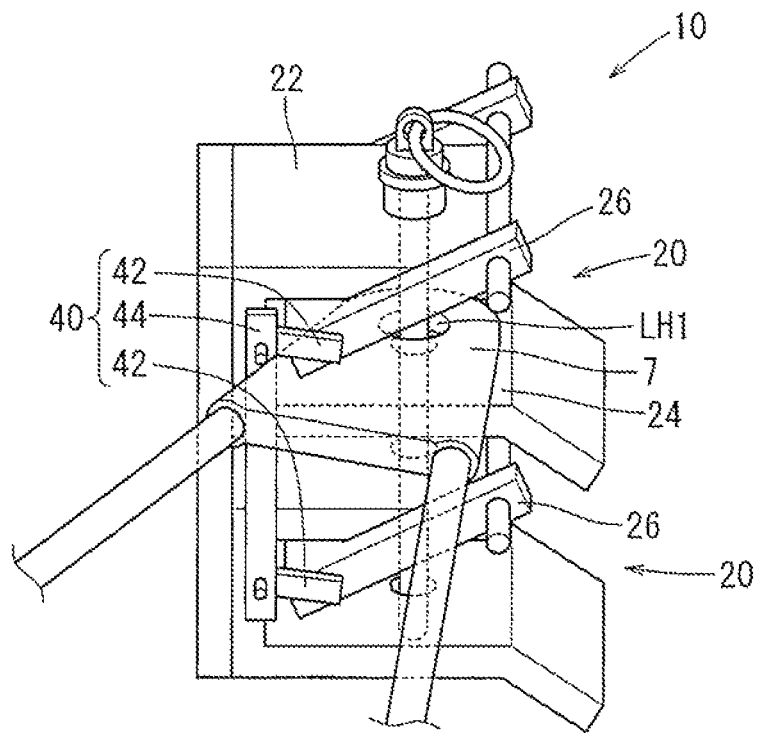
FIG. 10 is a perspective view of a state where the connecting arm connected to the connecting device rotates toward a link member.

As shown in FIG. 9, the connection rod 30 is set to a dimension which allows it to be passed through the holes H of each connection portions 20. At the top portion of the connection rod 30, there is provided the flange portion 30a, which is of a larger diameter than the inner diameter of the cylindrical-portion hole SH1 and of the buffer-member hole SH2. Above the flange portion 30a, there is provided a pull-out ring 32 for facilitating an operation of pulling out the connection rod 30, which is performed by the operator.

The arm receiving portions 26 are formed by plates having a predetermined thickness. As shown in FIGS. 4 and 7, the arm receiving portions 26 are installed in the respective connection portions 20 at an inclined standby state. When the connection arm 7 is inserted into either guide space K, either arm receiving portion 26 in the standby state interferes with the connection arm 7, and is rotated upwards. Each arm receiving portion 26 in the standby state crosses the axis of each hole H of each connection portion 20 in the front-rear direction. The axis extends in the vertical direction. Each arm receiving portion 26 is inclined downwardly forward from the rear.

The upper end portion of each arm receiving portion 26 is mounted to a rotation support bar 27 behind the hole H of the rod guide portion 22. The rotation support bar 27 is fixed to the rod guide portion 22 by welding or the like. As a result, the arm receiving portion 26 is supported by the rotation support bar 27 so as to be vertically rotatable (See FIG. 4). The arm receiving portion 26 is mounted to the rotation support bar 27 by passing the rotation support bar 27 through hole portions provided at right and left sides of a passed-through portion 26a (See FIG. 3).

The lower end of the arm receiving portion 26 is in a free state. As shown in FIG. 7, the distal end portion of the arm receiving portion 26 is held in contact with the guide lower portion 24 in front of the hole H of the guide lower portion 24. As shown in FIG. 9, the free state end of the arm receiving portion 26 interferes with the connection arm 7, and rotates upwardly to the vicinity of the rod guide portion 22. In the state shown in FIG. 9, the arm receiving portion 26 has been rotated upwardly.

Each arm receiving portion 26 is provided with the passed-through portion 26a (See FIG. 3). The passed-through portion 26a is formed such that when the arm receiving portion 26 has been rotated upward, the connection rod 30 can be passed in the vertical direction. The passed-through portion 26a is formed in the middle and upper regions of the arm receiving portion 26. The passed-through portion 26a is formed by inclining the arm receiving portion 26 and by cutting it out in the front-rear direction.

Figure 8:
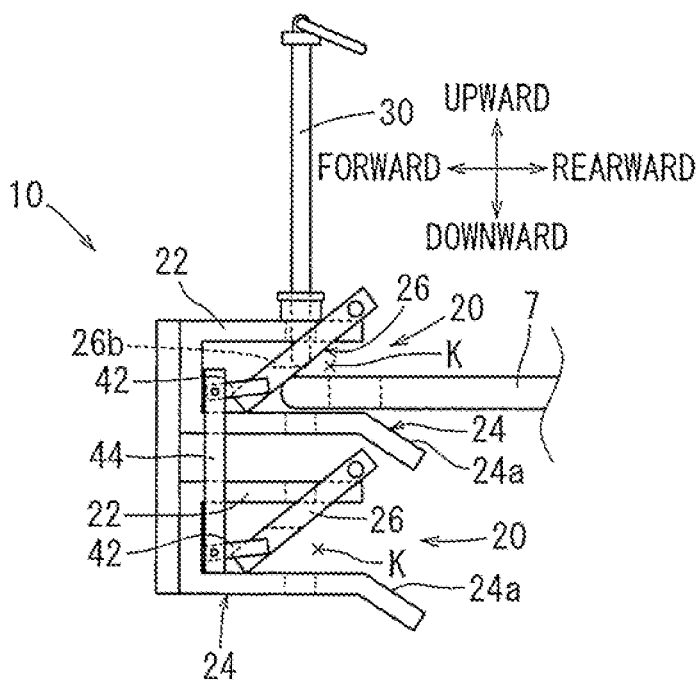
FIG. 8 is a side view of the connection device and the connection arm in a state when the connection arm has started to be inserted into the connection device.

The upper arm receiving portion 26 has a wall forming the lower end of the passed-through portion 26a, and the wall forms a rod retaining portion 26b (See FIGS. 3 and 4). When the arm receiving portion 26 is in the standby state, the rod retaining portion 26b supports the connection rod 30 from below to retain it at a rod retaining position (See FIGS. 4 and 6). At the rod retaining position, the rod retaining portion 26b retains the lower end of the connection rod 30 in the upper guide space K. As a result, the connection rod 30 is prevented from being passed through the hole H of the guide lower portion 24 of the upper connection portion 20 and through the holes H of the lower connection portion 20. As shown in FIG. 8, the rod retaining position is set to be at a position higher than the connection arm 7 inserted into the upper connection portion 20.

As the arm receiving portion 26 rotates, the rod retaining portion 26b is positioned at the following positions. When the arm receiving portion 26 of the upper connection portion 20 is in the standby state, the rod retaining portion 26b interferes with the connection rod 30 inserted into the hole H of the rod guide portion 22 of the upper connection portion 20. When the arm receiving portion 26 of the upper connection portion 20 has been rotated upward, the rod retaining portion 26b does not interfere with the connection rod 30 passed through the holes H of each connection portion 20.

The arm receiving portions 26 of the connection portions 20 are connected by a link member 40 such that when either arm receiving portion 26 is rotated upwardly from the standby state, both of them are rotated upwards in conjunction with each other (See FIGS. 3 to 9).

The link member 40 has a connection plate 44 and coupling plates 42. The connection plate 44 connects the coupling plates 42 so as to allow them to make a conjunction movement. The coupling plates 42 retain the connection plate 44 at a position where interference with the connection arm 7 is avoided. The connection arm 7 is inserted into one of the connection portions 20 to be connected with the connection rod 30. The connection arm 7 rotates around the connection rod 30. The link member 40 is arranged at a position where it is possible to avoid interference with the connection arm 7 when the connection arm 7 rotates toward the link member 40 (See FIG. 8).

On the left side of each arm receiving portion 26, one end of each coupling plate 42 is fixed at a position where interference with the connection arm 7, which is inserted into the connection portion 20, is avoided (See FIG. 4). As shown in FIG. 8, each coupling plate 42 is downwardly inclined at a gentler slope than the arm receiving portion 26.

Each coupling plate 42 has a first end fixed to each arm receiving portion 26, and a second end opposite to the first end. A rotation shaft bar R is provided at the second end of each coupling plate 42 (See FIGS. 3 and 4). The connection plate 44 is mounted to the rotation shaft bars R of the coupling plates 42. The connection plate 44 is supported so as to be rotatable with respect to the coupling plates 42.

The arm receiving portions 26 connected by the link member 40 can move in conjunction with each other; they rotate vertically in synchronization with each other. In the standby state, the connection rod 30 is retained at the rod retaining position by the rod retaining portion 26b. The arm receiving portions 26 move through interference with the connection arm 7 inserted into one of the upper and lower guide spaces K. As a result, the connection rod 30 falls due to its own weight and the retention by the rod retaining portion 26b is released (See FIG. 7).

At the distal end of the connection arm 7, there is provided an arm hole LH1 through which the connection rod 30 can be passed (See FIG. 4). Thus, as shown in FIG. 9, the connection rod 30 falls due to its own weight, and passes through the holes H of the connection portions 20 and through the arm hole LH1 of the connection arm 7. As a result, the connection portion 20 into which the connection arm 7 is inserted and the connection arm 7 are connected to each other.

It is possible to connect the connection arm 7 with the connection portion 20 when the connection arm 7 is inserted into either of the upper and lower guide spaces K. First, the method in which the connection arm 7 is inserted into the upper guide portion will be described.

As shown in FIG. 7, before the connection device 10 and the connection arm 7 are connected to each other, the arm receiving portion 26 of each connection portion 20 is in the standby state. The connection rod 30 is passed through the buffer-member hole SH2, the cylindrical-portion hole SH1, and the hole H of the rod guide portion 22 of the upper connection portion 20. The lower end of the connection rod 30 is supported by the rod retaining portion 26b, and the connection rod 30 is retained at the rod retaining position. The side surface of the connection rod 30 is supported by the hole wall surface of the cylindrical-portion hole SH1, and the connection rod 30 stands at the rod retaining position.

The pulling drive vehicle 1 is moved rearwards from the state shown in FIG. 7. The relative distance between the connection device 10 and the connection arm 7 is reduced. The connection arm 7 enters the guide space K of the higher connection portion 20. After contacting the guide surface 24a, the connection arm 7 is inserted into the guide space K at a position lower than the rod retaining portion 26b. As shown in FIG. 8, the distal end of the connection arm 7 contacts the lower surface of the arm receiving portion 26. At this time, the connection rod 30 is still retained at the rod standby position.

When the connection arm 7 further enters the guide space K (See FIG. 3), the connection arm 7 gets under the arm receiving portion 26 as shown in FIG. 9, and pushes up the distal end of the arm receiving portion 26. The arm receiving portion 26 of the upper connection portion 20 is upwardly rotated from the standby state to an upward rotation state. In conjunction therewith, the arm receiving portion 26 of the lower connection portion 20 is also upwardly rotated to the upward rotation state.

As the arm receiving portion 26 of the upper connection portion 20 rotates upwardly, the support of the connection rod 30 by the rod retaining portion 26b of the arm receiving portion 26 is released. As a result, the connection rod 30 falls from the passed-through portion 26a of the arm receiving portion 26 (See FIG. 3) due to its own weight. The connection rod 30 falls through the arm hole LH1 of the connection arm 7, through the hole H of the guide lower portion 24 of the upper connection portion 20, through the hole H of the rod guide portion 22 of the lower connection portion 20, through the passed-through portion 26a (See FIG. 3) of the arm receiving portion 26 of the lower connection portion 20, and through the hole H of the guide lower portion 24 of the lower connection portion 20.

The flange portion 30a of the connection rod 30 is received by the cylindrical portion 22a via the buffer member 28, whereby the fall of the connection rod 30 stops. The connection rod 30 is passed through the holes H of the connection portions 20 and through the arm hole LH1 of the connection arm 7. As a result, the upper connection portion 20 and the connection arm 7 are connected to each other. By providing the buffer member 28 on top of the cylindrical portion 22a, the shock to the flange portion 30a and the cylindrical portion 22a is mitigated. Thus, the durability of the connection rod 30 and of the cylindrical portion 22a is enhanced.

The link member 40 is provided at a position where it can avoid interference with the connection arm 7 when the connection arm 7 connected to the upper connection portion 20 rotates around the connection rod 30 to the link member 40 (See FIG. 8). Thus, it is possible to prevent the link member 40 and the connection arm 7 from contacting each other and damaging the link member 40 and the connection arm 7.

When the connection between the connection device 10 and the connection arm 7 is to be released from the state shown in FIG. 9, the pull-out ring 32 is gripped to pull up the connection rod 30. When the connection rod 30 is pulled up to the rod retaining position, the connection between the upper connection portion 20 and the connection arm 7 is released. By moving the pulling drive vehicle 1 forwards in this state, it is possible to pull the connection arm 7 out of the guide space K of the upper connection portion 20. When the connection arm 7 is pulled out of the guide space K, the arm receiving portions 26 of the connection portions 20 rotate downwardly from the upward rotation state to be restored to the standby state.

As shown in FIG. 7, the arm receiving portions 26 of the upper and lower connection portions 20 move in conjunction with each other to vertically rotate. Thus, even in the case where the connection arm 7 is inserted into the guide space K of the lower connection portion 20, the connection rod 30 falls from the rod retaining position due to its own weight as in the case where the connection arm 7 is inserted into the guide space K of the upper connection portion 20. As a result, the lower connection portion 20 and the connection arm 7 are connected to each other.

That is, when the connection arm 7 enters the guide space K of the lower connection portion 20, the connection arm 7 pushes up the distal end of the arm receiving portion 26 in the standby state. When the insertion of the connection arm 7 is continued, the arm receiving portion 26 of the lower connection portion 20 rotates upwardly from the standby state to the upward rotation state. In synchronization with the lower arm receiving portion 26, the arm receiving portion 26 of the upper connection portion 20 is also rotated upwardly from the standby state to the upward rotation state.

As the arm receiving portion 26 of the upper connection portion 20 rotates, the support of the connection rod 30 by the rod retaining portion 26b of the arm receiving portion 26 is released. As a result, the connection rod 30 falls from the passed-through portion 26a (See FIG. 3) of the upper arm receiving portion 26 due to its own weight. The connection rod 30 passes through the holes H of the connection portions 20 and through the arm hole LH1 of the connection arm 7. As a result, the lower connection portion 20 and the connection arm 7 are connected to each other.

The connection device 10 has two (upper and lower) connection portions 20, and the connection arm 7 is inserted into the guide space K of one of the connection portions 20. The arm receiving portions 26 rotate upwards from the standby state in synchronization with each other via the link member 40. The support of the lower end of the connection rod 30 by the rod retaining portion 26b is released, and the connection rod 30 falls due to its own weight, passing through the holes H of the connection portions 20. The connection arm 7 and the connection portion 20 into which the connection arm 7 is inserted are connected to each other. Thus, even if the vertical position of the connection arm 7 extending from the aircraft 3 to the pulling drive vehicle 1 is changed, the connection arm 7 is inserted into the guide space K of either connection portion K. In this way, the pulling drive vehicle 1 and the aircraft 3 can be connected to each other.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. For example, embodiments of the present invention should not be limited to the representative configurations, but may be modified, for example, as described below.

In the above-described embodiment, the connection arm 7 is provided on the aircraft 3 constituting the object of pulling. The connection device 10 is provided on the pulling drive vehicle 1, which performs the pulling. Instead of this configuration, the connection arm may be provided on the pulling drive vehicle which performs the pulling, and the connection device 10 may be provided on the object of pulling.

In the above-described embodiment, the connection device 10 is provided on the pulling drive vehicle 1 which pulls the aircraft 3. Alternatively, the connection device 10 may be provided on a pulling drive vehicle other than the pulling drive vehicle for the aircraft 3, such as a pulling drive vehicle for pulling a carriage.

Figure 11:
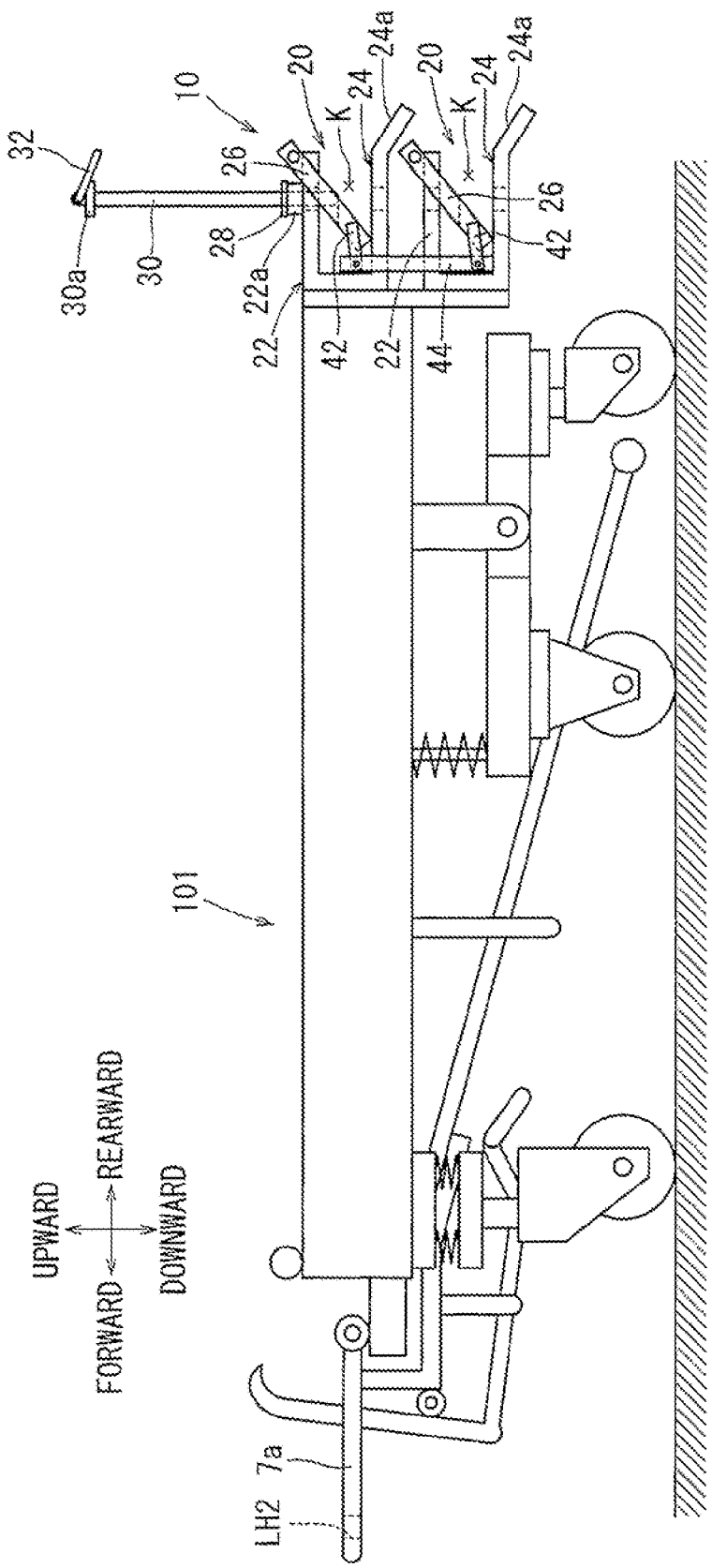
FIG. 11 is a side view of a pulling carriage.
Figure 12:
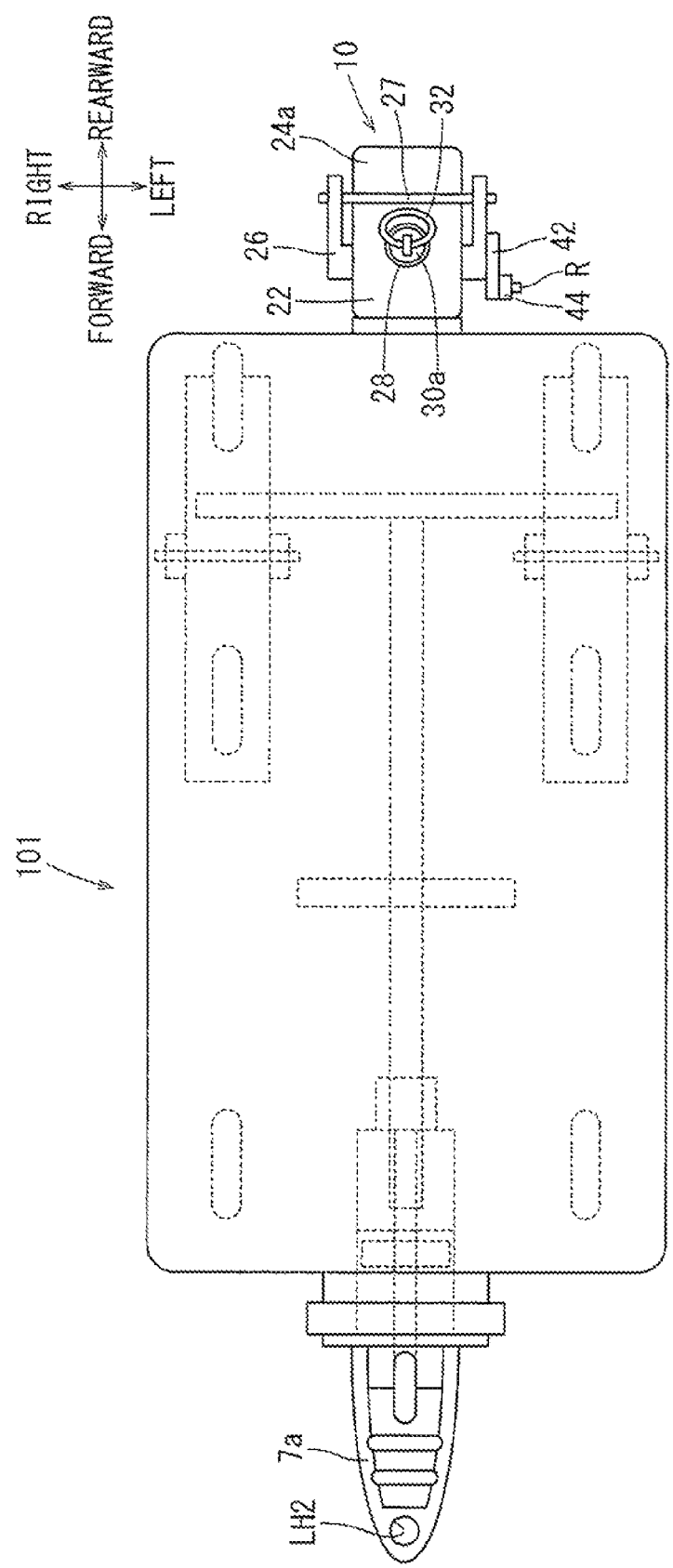
FIG. 12 is a plane view of the pulling carriage.

As shown in FIGS. 11 and 12, the connection device 10 may be provided on a pulling carriage 101. The pulling carriage 101 is used to convey various components, complete products, etc. in, for example, a production line of a plant. At the rear end thereof, the pulling carriage 101 is provided with the connection device 10 having the connection portions 20 and the connection rod 30. At the front end thereof, the pulling carriage 101 is provided with a connection arm 7a having the arm hole LH2 through which the connection rod 30 can be passed. Thus, by longitudinally arranging a plurality of pulling carriages 101, and by connecting the connection device 10 of the front pulling carriage 101 to the connection arm 7a of the rear pulling carriage 101, it is possible to connect a plurality of pulling carriages 101.

In the above embodiment, the connection device 10 has two connection portions 20 arranged in the vertical direction. Alternatively, the connection device may have three or more connection portions 20 arranged in the vertical direction.

In the above embodiment, the rod retaining portion 26b and the arm receiving portion 26 are formed integrally. Alternatively, the rod retaining portion and the arm receiving portion may be formed as separate members, with the rod retaining portion being fixed to the arm receiving portion or mounted thereto so as to be movable. In the above-described embodiment, the arm receiving portion 26 in the standby state is inclined with respect to the horizontal direction. Alternatively, the arm receiving portion 26 in the standby state may be erected vertically, with the rod retaining portion 26b protruding from the arm receiving portion 26 toward the connection rod 30.

In the above embodiment, the arm receiving portion 26 is pushed by the connection arm 7 to rotate upwards. Alternatively, the arm receiving portion 26 may be pushed by the connection arm 7 to rotate downwards or in the horizontal direction. In this case, the arm receiving portion 26 may be restored to the standby state by a bias member.

In the above embodiment, the connection rod 30 falls due to its own weight when released from the rod retaining portion 26*b*. Alternatively, the connection rod 30 may move downwards by being pushed by the operator or the like.

In the above embodiment, the holes H of the upper and lower rod guide portions 22 are situated in the same vertical line. Alternatively, the holes H of the upper and lower rod guide portions 22 may be situated in an inclined straight line. In the above embodiment, the flange portion is provided at the upper end of the rod. Alternatively, the flange portion may be provided in the upper portion but below the upper end of the rod.

The invention claimed is:

1. A connection device for connecting to a connection arm comprising:
   a first connection portion in which a first guide space is formed, the connection arm being inserted in the first space;
   a second connection portion provided below the first connection portion, a second guide space being formed in the second connection portion, the connection arm being inserted in the second space;
   a first rod guide portion provided above the first guide space, and a first hole being formed in the first rod guide portion;
   a second rod guide portion provided above the second guide space, and a second hole being formed in the second rod guide portion;
   a first arm receiving portion being pushed by the connection arm to rotate from a standby state when the connection arm is inserted into the first guide space;
   a second arm receiving portion being pushed by the connection arm to rotate from a standby state when the connection arm is inserted into the second guide space;
   a link member configured to connect the first arm receiving portion and the second arm receiving portion such that the first arm receiving portion and the second arm receiving portion rotate in conjunction with each other;
   a connection rod passed through the first hole and the second hole; and
   a rod retaining portion configured to support a lower end of the connection rod within the first guide space when the first arm receiving portion is in the standby state, and the rod retaining portion configured to rotate together with the first arm receiving portion to allow the connection rod to pass through the second hole so that the connection rod is enabled to be connected to the connection arm inserted into the first guide space or the second guide space, when the first arm receiving portion rotates from the standby state.

2. The connection device of claim 1, wherein the first arm receiving portion and the second arm receiving portion are each inclined in the standby state with respect to a direction in which the connection arm is inserted.

3. The connection device of claim 1, wherein the connection rod is configured to move toward the second hole due to its own weight when its movement is enabled by the rod retaining portion.

4. The connection device of claim 3, wherein the first hole and the second hole are situated along a common axis.

5. The connection device of claim 1, wherein the link member is provided at a position where the link member avoids interference with the connection arm when the connection arm connected to the connection rod rotates around the connection rod.

6. The connection device of claim 1, wherein the first rod guide portion is provided with a cylindrical portion continuous with the first hole and configured to guide a vertical movement of the connection rod.

7. The connection device of claim 6, wherein:
   a flange portion of a larger diameter than inner diameter of the cylindrical portion is provided on an upper portion of the connection rod, and
   a buffer member is provided above the cylindrical portion, the buffer member is configured to mitigate impact between the connection rod fallen due to its own weight and the flange portion.

8. A pulling drive vehicle comprising:
   a connection device for connecting to a connection arm, the connection device comprising:
   a first connection portion in which a first guide space is formed, the connection arm being inserted in the first space;
   a second connection portion provided below the first connection portion, a second guide space being formed in the second connection portion, the connection arm being inserted in the second space;
   a first rod guide portion provided above the first guide space, and a first hole being formed in the first rod guide portion;
   a second rod guide portion provided above the second guide space, and a second hole being formed in the second rod guide portion;
   a first arm receiving portion being pushed by the connection arm to rotate from a standby state when the connection arm is inserted into the first guide space;
   a second arm receiving portion being pushed by the connection arm to rotate from a standby state when the connection arm is inserted into the second guide space;
   a link member configured to connect the first arm receiving portion and the second arm receiving portion such that the first arm receiving portion and the second arm receiving portion rotate in conjunction with each other;
   a connection rod passed through the first hole and the second hole; and
   a rod retaining portion configured to support a lower end of the connection rod within the first guide space when the first arm receiving portion is in the standby state, and the rod retaining portion configured to rotate together with the first arm receiving portion to allow the connection rod to pass through the second hole so that the connection rod is enabled to be connected to the connection arm inserted into the first guide space or the second guide space, when the first arm receiving portion rotates from the standby state.

9. A pulling carriage comprising:
   a connection device for connecting to a connection arm, the connection device comprising:
   a first connection portion in which a first guide space is formed, the connection arm being inserted in the first space;
   a second connection portion provided below the first connection portion, a second guide space being formed in the second connection portion, the connection arm being inserted in the second space;

a first rod guide portion provided above the first guide space, and a first hole being formed in the first rod guide portion;

a second rod guide portion provided above the second guide space, and a second hole being formed in the second rod guide portion;

a first arm receiving portion being pushed by the connection arm to rotate from a standby state when the connection arm is inserted into the first guide space;

a second arm receiving portion being pushed by the connection arm to rotate from a standby state when the connection arm is inserted into the second guide space;

a link member configured to connect the first arm receiving portion and the second arm receiving portion such that the first arm receiving portion and the second arm receiving portion rotate in conjunction with each other;

a connection rod passed through the first hole and the second hole; and a rod retaining portion configured to support a lower end of the connection rod within the first guide space when the first arm receiving portion is in the standby state, and the rod retaining portion configured to rotate together with the first arm receiving portion to allow the connection rod to pass through the second hole so that the connection rod is enabled to be connected to the connection arm inserted into the first guide space or the second guide space, when the first arm receiving portion rotates from the standby state.

* * * * *